US009405083B2

(12) United States Patent  
Bora et al.

(10) Patent No.: US 9,405,083 B2  
(45) Date of Patent: Aug. 2, 2016

(54) OMNIDIRECTIONAL OPTICAL WAVEGUIDE

(71) Applicant: Lawrence Livermore National Security, LLC, Livermore, CA (US)

(72) Inventors: Mihail Bora, Livermore, CA (US); Tiziana C. Bond, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 436 days.

(21) Appl. No.: 13/898,393

(22) Filed: May 20, 2013

(65) Prior Publication Data

US 2015/0253434 A1  Sep. 10, 2015

(51) Int. Cl.
*G01T 1/20* (2006.01)
*G02B 6/42* (2006.01)

(52) U.S. Cl.
CPC ............... *G02B 6/4298* (2013.01); *G01T 1/20* (2013.01)

(58) Field of Classification Search
CPC ....... G01T 1/20; G01T 1/2018; G02B 6/4298
See application file for complete search history.

(56) References Cited

U.S. PATENT DOCUMENTS

| | | | | |
|---|---|---|---|---|
| 5,179,284 A | * | 1/1993 | Kingsley | B29C 51/16 250/367 |
| 2009/0101844 A1 | * | 4/2009 | Ohbayashi | G01T 1/20 250/488.1 |
| 2010/0276602 A1 | * | 11/2010 | Clothier | G01T 3/06 250/362 |

OTHER PUBLICATIONS

Baumbaugh, B., et al., "Performance of multiclad scintillating and clear wave-guide fibers readout with visible light photon counters," Nuclear Instruments & Methods in Physics Research Section a-Accelerators Spectrometers Detectors and Associated Equipment, 1994. 345(2): p. 271-278.
Hartmann, J., et al., "Light guides for the Zeus forward and rear calorimeter," Nuclear Instruments & Methods in Physics Research Section a-Accelerators Spectrometers Detectors and Associated Equipment, 1991. 305(2): p. 366-375.
Li, J. and C.-h. Jiang, "A new cylindrical light guide," Physica Energiae Fortis et Physica Nuclearis, 1984.8(1): p. 122-124124.
Maekawa, T. and M. Voda, "Multipoint radiation monitor using waveguide scintillators and optical fiber," Proceedings of the SPIE— The International Society for Optical Engineering, 1995. 2551: p. 65-7474.
Maekawa, T., et al., "Fiber-optic multipoint radiation sensing system using waveguide Scintillators," Journal of Nuclear Science and Technology, 1996. 33(5): p. 381-389.

(Continued)

*Primary Examiner* — Casey Bryant
(74) *Attorney, Agent, or Firm* — Zilka Kotab

(57) ABSTRACT

In one embodiment, a system includes a scintillator material; a detector coupled to the scintillator material; and an omnidirectional waveguide coupled to the scintillator material, the omnidirectional waveguide comprising: a plurality of first layers comprising one or more materials having a refractive index in a first range; and a plurality of second layers comprising one or more materials having a refractive index in a second range, the second range being lower than the first range, a plurality of interfaces being defined between alternating ones of the first and second layers. In another embodiment, a method includes depositing alternating layers of a material having a relatively high refractive index and a material having a relatively low refractive index on a substrate to form an omnidirectional waveguide; and coupling the omnidirectional waveguide to at least one surface of a scintillator material.

23 Claims, 7 Drawing Sheets

(56) References Cited

OTHER PUBLICATIONS

Fink, V., et al., "A dielectric omnidirectional reflector," Science, 1998. 282(5394): p. 1679-1682.

Lee, H.V. and T. Vao, "Design and evaluation of omnidirectional one-dimensional photonic Crystals," Journal of Applied Physics, 2003. 93(2): p. 819-830.

Wang, X., et al., "Enlargement of omnidirectional total reflection frequency range in onedimensional photonic crystals by using photonic heterostructures," Applied Physics Letters, 2002. 80(23): p. 4291-4293.

Xifre-Perez, E., et al., "Porous silicon omnidirectional mirrors and distributed Bragg reflectors for planar waveguide applications," Journal of Applied Physics, 2007. 102(6).

Decorby, R.G., et al., "Planar omnidirectional reflectors in chalcogenide glass and polymer," Optics Express, 2005. 13(16): p. 6228-6233.

Mugnier, J., C. Le Luyer, and A.G. Murillo, "High quality sol-gel thin films: elaboration, studies in waveguiding configuration and application to sol gel scintillators," in Advances in Optical Thin Films, C. Amra, N. Kaiser, and H.A. Macleod, Editors. 2003, Spie-Int Soc Optical Engineering: Bellingham. p. 589-596.

Ottonello, P., et al., "An X-ray area detector with scintillating glass-fiber optics," Nuclear Instruments & Methods in Physics Research Section a-Accelerators Spectrometers Detectors and Associated Equipment, 1992. 323(1-2): p. 485-488.

Ruchti, R., "Performance of multiclad scintillating and waveguide optical fibers read out with visible light photon counters," Proceedings of the SPIE—The International Society for Optical Engineering, 1993. 2007: p. 78-9494.

Shao, H., D.W. Miller, and C.R. Pearsall, "Scintillating fiber optics and their applications in radiographic systems," IEEE Transactions on Nuclear Science, 1991. 38(2): p. 845-857.

Cole, G.D., et al., "Short-wavelength MEMS-tunable VCSELs," Optics Express, 2008. 16(20): p. 16093-16103.

* cited by examiner

OMNIDIRECTIONAL OPTICAL WAVEGUIDE

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to radiation detection, and more particularly to systems and methods for reducing light loss in a scintillator material suitable for radiation detection.

BACKGROUND

Conventional scintillator materials excel at detecting incident radiation of various types according to predetermined characteristics of the material and/or radiation, notably including spectral band (wavelength) of the incident radiation. The scintillator material absorbs the radiation, generating a scintillation event, which emits light into the scintillator material. Preferably, the light is emitted in the direction of a detector coupled to the scintillator material, such as a photomultiplier, which converts the photon to electrical potential, generating an observable signal. However, there is an element of randomness to the direction in which light is emitted from the scintillation event. While most light emitted from the scintillator typically undergoes total internal reflection (TIR), i.e. reflection with 100% efficiency, and therefore reaches the photomultiplier, in conventional arrangements some light loss is experienced, reducing the scintillator sensitivity and resolution.

For example, if the light is emitted in a particular range of angles close to a direction normal to the orientation of the scintillator material surface (also known as an "escape cone"), upon reaching the scintillator-air interface, the light will escape the scintillator material rather than undergoing TIR and reaching the photomultiplier. Similarly, light traversing the scintillator material may undergo backscattering events, e.g. upon light encountering an inclusion or impurity in the scintillator material. Backscatter events introduce another opportunity for light to be emitted in a direction that would result in escape and ultimate signal loss.

In an attempt to improve the sensitivity and resolution of scintillator materials by reducing losses such as those described above, some groups have employed reflective scattering approaches, such as can be achieved by wrapping a scintillator material in a reflective tape (such as Teflon). These reflective wrapping techniques beneficially reduce the amount of light that escapes form the scintillator material, but since the reflective wrappings operate by scattering light without any significant directional guidance, light propagation is inefficient, which can also cause undesirable signal losses.

Other attempts to solve the signal loss problems described above have employed metallic layers, for example aluminum having a high reflectance coefficient, typically about 90%, to reflect escaping light back into a scintillator material. However, while the metals have high reflectance coefficients, signal is still lost with each reflectance event, ultimately causing unacceptable signal loss over a potentially large number of events in a given experiment. For example, assuming a 90% reflectance coefficient, the scintillator-metal arrangement would lose 10% at each reflectance event, which translates to a loss of half of the original signal with merely 10 events. As will be appreciated by one having ordinary skill in the art, this fact is severely limiting on the size and therefore suitability for various applications, of the underlying scintillator material.

Accordingly, it would be beneficial to provide systems and methods for improving scintillator sensitivity and resolution by reducing signal losses without suffering from the drawbacks associated with reflective wrapping and metal mirrors currently in use to address the problem of signal loss.

SUMMARY

In one embodiment, a system includes a scintillator material; a detector coupled to the scintillator material; and an omnidirectional waveguide coupled to the scintillator material, the omnidirectional waveguide comprising: a plurality of first layers comprising one or more materials having a refractive index in a first range; and a plurality of second layers comprising one or more materials having a refractive index in a second range, the second range being lower than the first range, a plurality of interfaces being defined between alternating ones of the first and second layers.

In another embodiment, a method includes depositing alternating layers of a material having a relatively high refractive index and a material having a relatively low refractive index on a substrate to form an omnidirectional waveguide; and coupling the omnidirectional waveguide to at least one surface of a scintillator material.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of in-vitro tissue bioreactors and/or related methods.

The presently disclosed technology demonstrates an omnidirectional waveguide for maximizing total internal reflection (TIR) in a medium surrounded in whole or in part by the omnidirectional waveguide. The waveguide is particularly suitable for radiation-detection applications using scintillator materials as the detection medium. By surrounding a three-dimensional scintillator structure in whole or in part with the omnidirectional waveguide, nearly all light generated by scintillating events in the scintillator material may be retained within the structure and directed to a detector due to 99% or greater reflectance of escaping light back into the scintillator material, achieved by the omnidirectional waveguide.

In one general embodiment, a system includes a scintillator material; a detector coupled to the scintillator material; and an omnidirectional waveguide coupled to the scintillator material, the omnidirectional waveguide comprising: a plurality of first layers comprising one or more materials having a refractive index in a first range; and a plurality of second layers comprising one or more materials having a refractive index in a second range, the second range being lower than the first range, a plurality of interfaces being defined between alternating ones of the first and second layers.

In another general embodiment, a method includes depositing alternating layers of a material having a relatively high refractive index and a material having a relatively low refractive index on a substrate to form an omnidirectional waveguide; and coupling the omnidirectional waveguide to at least one surface of a scintillator material.

Referring now to the Figures, exemplary embodiments of the inventive concepts presented herein will be described graphically with reference to several schematics, graphs and flowcharts. The Figures and descriptions are presented by way of example and are not to be considered limiting in any way.

Figure 1A:
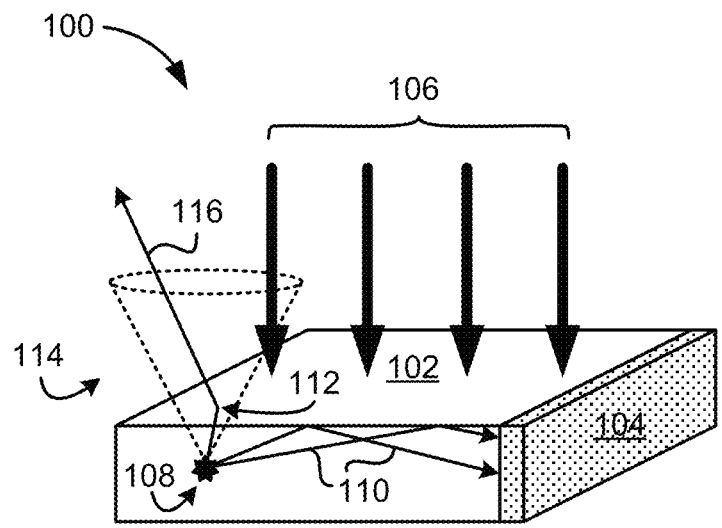
FIG. 1A depicts a simplified cross-sectional schematic of a scintillator material undergoing a scintillation event, according to the prior art.
Figure 1B:
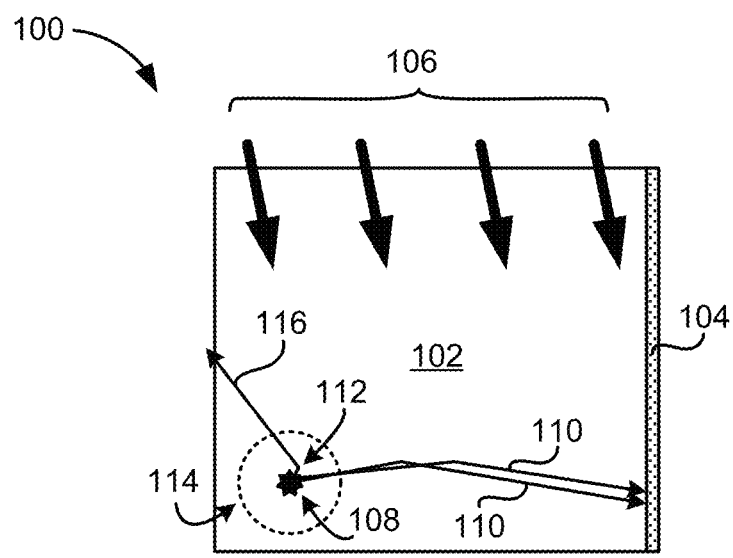
FIG. 1B depicts a simplified top-down view the scintillator material undergoing the scintillation event as shown in FIG. 1A, according to the prior art.

Referring now to FIGS. 1A and 1B, a simplified schematic of a conventional radiation detector 100 comprising a scintillator material 102 is shown from a cross-sectional view and a top-down view, respectively. As shown, the scintillator material 102 is in the process of undergoing a scintillation event 108 as a result of being exposed to incident radiation 106 such as gamma rays, neutrons, etc. as would be understood by one having ordinary skill in the art upon reading the present descriptions. According to principles well known in the art, the scintillator material absorbs the incident radiation and emits light in a particular spectral band in response.

The light is preferably emitted in a direction toward a detector 104 such as a photomultiplier. See, e.g., photon trajectories 110 as shown in FIG. 1A. The photon trajectories 110 need not be emitted directly toward the detector 104, so long as the incident angle of the light relative to the scintillator material surface 112 is sufficient to reflect the photons back into the scintillator material upon reaching the surface 112, as shown with photon trajectories 110 in FIG. 1A. Some of the light is reflected with 100% efficiency (TIR).

However, if the incident angle of the photon trajectory is sufficiently close to normal with respect to the scintillator material surface 112, the scintillator material 102 cannot reflect the photon back in to the scintillator material 102, as is the case with the photon escaping along trajectory 116. The range of incident angle(s) sufficiently close to normal to allow light to escape define an escape cone 114 with respect to any given scintillating event 108. The escape cones 114 of any given conventional scintillator material provide avenues of escape for light, resulting in undesirable signal loss. This limitation of the prior art radiation detector systems raises the detection threshold, meaning that potentially harmful radiation (such as incident radiation 106) may be present but go undetected because the light emitted by the scintillation event 108 in response to absorbing the incident radiation 106 never reaches the detector 104. Similarly, radiation may be detected but the amount falsely believed to be tolerable (low), when in fact the total amount of radiation present is higher than reported, the discrepancy being due to losses as described above. Accordingly, to enable highly sensitive and efficient radiation detection, it would be advantageous to provide a radiation detection system that does not suffer from the limiting drawbacks of prior art radiation detectors comprising scintillator materials, such as shown in FIGS. 1A and 1B.

Figure 2:
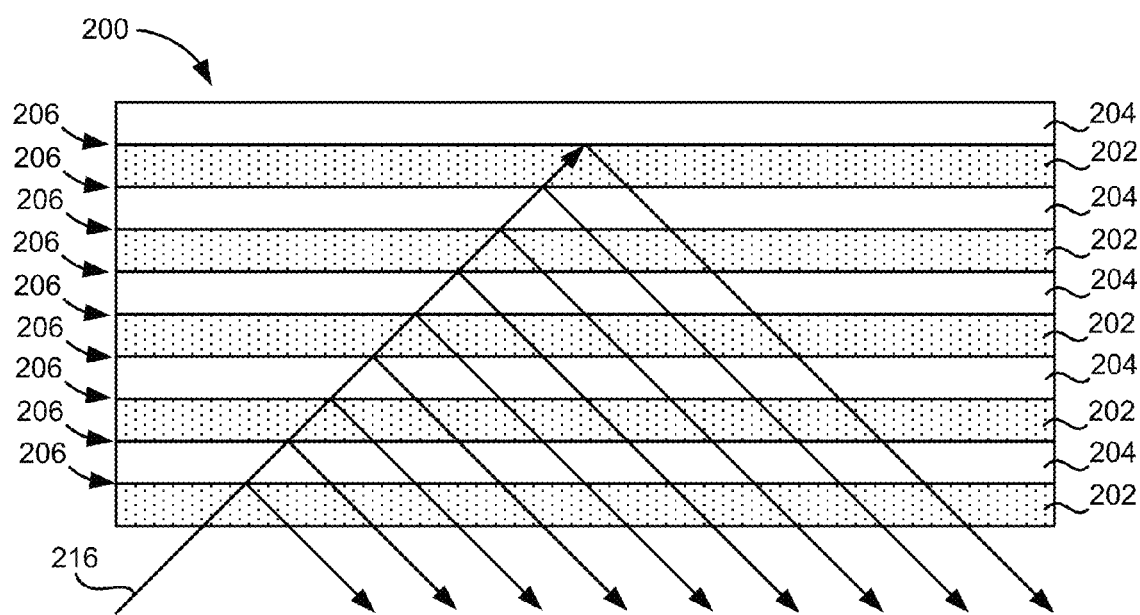
FIG. 2 depicts a simplified cross-sectional schematic of an omnidirectional waveguide, according to one embodiment.

FIG. 2 depicts a simplified cross-sectional schematic of an omnidirectional waveguide 200, according to one embodiment. The omnidirectional waveguide embodiment shown in FIG. 2 is structure comprising an alternating stack of layers 202, 204, each adjacent pair of layers 202, 204 defining an interface 206 therebetween. Notably, the omnidirectional waveguide 200 should be at least partially transparent to incident radiation of a predetermined characteristic and/or type to allow the scintillator material to absorb the incident radiation and emit light to the detector. In various embodiments, the predetermined characteristic and/or type may be defined according a particular spectral range, wavelength, frequency, particle identity, or other property of the incident radiation desired to be detected using the radiation detection system, as would be understood by one having ordinary skill in the art upon reading the present descriptions.

In one embodiment, the interfaces 206 are configured to reflect light in a predetermined spectral band, such as escaping photon traveling along photon trajectory 216 as shown in FIG. 2. The predetermined spectral band can be any range of wavelengths, but is preferably a range of wavelengths to which the detector of the radiation detection system is sensitive in order to best prevent signal loss, in some embodiments. In particularly preferred approaches, the predetermined spectral band includes light having a wavelength in a range from about 300 nm and about 500 nm, more preferably in a range from about 375 nm and about 475 nm.

In some embodiments, the alternating layers 202, 204 are arranged such that first layers 202 have a refractive index in a first range, and second layers 204 have a refractive index in a second range, the second range being lower than the first range. Preferably, the alternating layers 202, 204 are arranged such that the refractive indices of any two adjacent layers 202, 204 are highly divergent. Refractive indices are considered "highly divergent" within the scope of the present descriptions if a difference between the indices is at least 0.1 in one embodiment, at least 0.2 in a preferred embodiment, and at least 0.5 in a particularly preferred embodiment.

As will be understood by one having ordinary skill in the art, refractive index is a property determined largely by the composition of the material to which the index refers. Accordingly, the omnidirectional waveguide 200 may be constructed of alternating layers 202, 204 as described above, and the layers' corresponding refractive indices may be defined by controlling the composition of each respective layer. Any suitable refractive or reflective material(s) known to those having ordinary skill in the art may be used in the omnidirectional waveguide 200. Preferably, the material(s) have a refractive index in a range from about 0.5 to about 2.5, more preferably from about 0.9 to about 2, and even more preferably about 1.2 to about 1.8, in various embodiments. As will be further understood by those having ordinary skill in the art upon reading the present descriptions, particularly advantageous materials include silicon oxide, aluminum oxide, titanium oxide, hafnium oxide, magnesium fluoride and calcium fluoride. In some embodiments, the omnidirectional waveguide may be a dielectric mirror.

The omnidirectional waveguide 200, in preferred embodiments, is configured to reflect at least 95% of all light entering the omnidirectional waveguide 200 back into the material from which the light entered the omnidirectional waveguide 200, such as air, a scintillator material, or any other medium that would be understood by one having ordinary skill in the art upon reading the present descriptions. The configuration may include features such as the refractive indices and alternating layer structure described above, as well as the position and orientation of the omnidirectional waveguide 200 with respect to the source of the light to be reflected. In various approaches, the number of layers 202, 204 may be in a range of 2 to 100. In addition, the configuration may include features such as the number of layers in the omnidirectional waveguide 200 being not less than a minimum number, such as ten, twenty, or thirty layers, in various embodiments.

In additional and/or alternative embodiments, the layer configuration of the omnidirectional waveguide may be designed to produce constructive interference in the reflectance of any photons escaping the scintillator material and entering the omnidirectional waveguide 200. In one particular approach, this configuration may include constructing the omnidirectional waveguide such that an optical path difference at any given interface 206 between layers 202, 204 is a multiple of $\lambda/2$, where $\lambda$ is a wavelength of the light in a material from which the layer is composed. This may be accomplished, for example, by ensuring some or all of the layers of the omnidirectional waveguide 200 have a thickness t no less than $\lambda/4$.

Figure 4B:
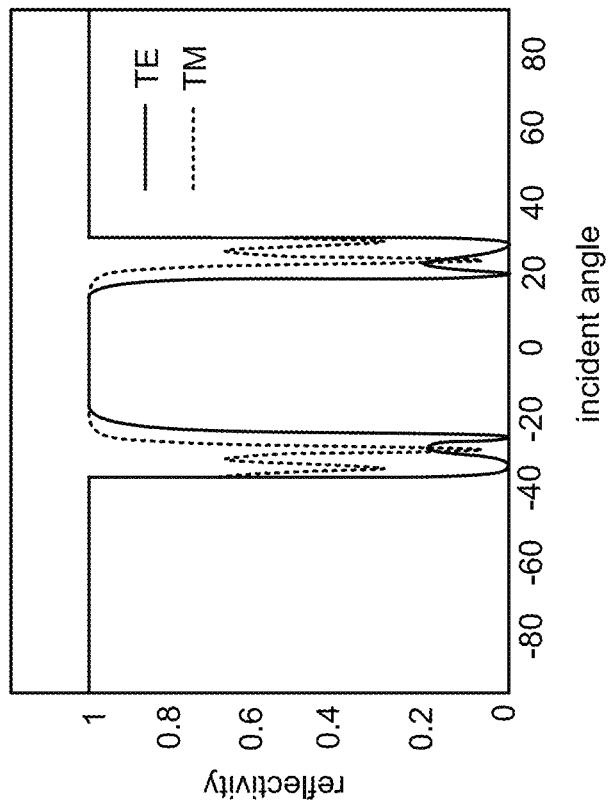
FIG. 4B depicts a graphical representation of reflectivity of an omnidirectional waveguide to light emitted from the scintillator material as a function of incident angle of the photon trajectory, according to one embodiment.

In even more preferred embodiments, the omnidirectional waveguide 200 the omnidirectional waveguide is configured to reflect light over an entire angular domain from −90 degrees to 90 degrees, as can be seen in FIG. 4B, discussed in further detail below. The ability to reflect light over the entire angular domain is critical to ensuring minimal signal losses, since reflecting light independent of the angle with which it approaches the omnidirectional waveguide 200 essentially eliminates the existence of escape cones such as escape cone 114 shown in FIGS. 1A and 1B.

Moreover, the omnidirectional waveguide may be characterized by a transverse magnetic (TM) polarization reflectivity of approximately 1.0 at a waveguide-air interface for light generated by a scintillating event and having an incident angle $\theta_{TM}$ selected from: a first range of approximately $-90° \leq \theta_{TM} \leq -30°$, a second range of approximately $-20° \leq \theta_{TM} \leq 20°$, and a third range of approximately $30° \leq \theta_{TM} \leq 90°$. Similarly, the omnidirectional waveguide may be characterized by a transverse electric (TE) polarization reflectivity of approximately 1.0 at a waveguide-air interface for light generated by a scintillating event and having an incident angle $\theta_{TE}$ selected from: a first range of approximately $-90° \leq \theta_{TE} \leq -30°$, a second range of approximately $-15° \leq \theta_{TE} \leq 15°$, and a third range of approximately $30° \leq \theta_{TE} \leq 90°$. These relationships can also be viewed in FIG. 4B, described in further detail below.

Figure 3:
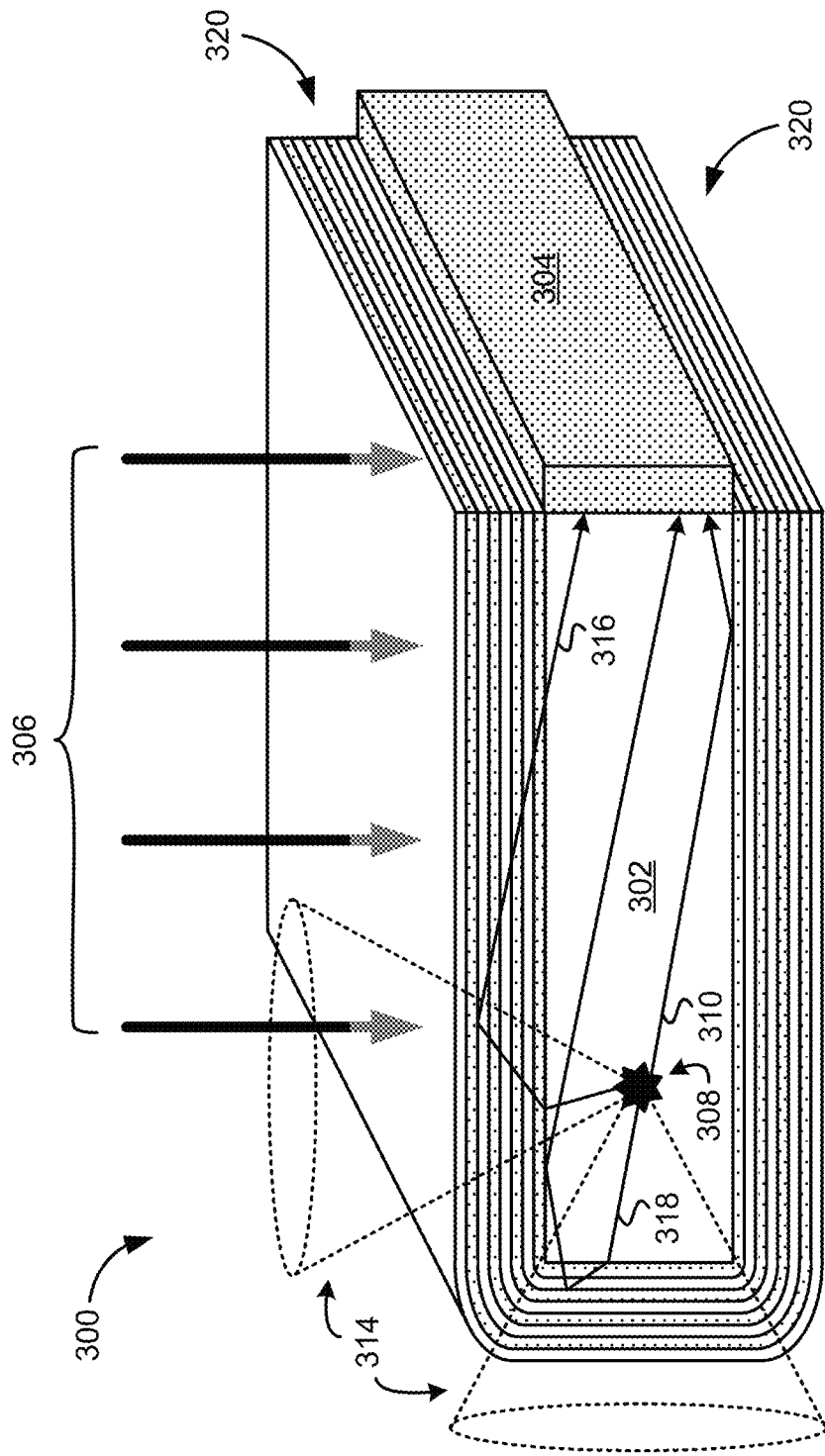
FIG. 3 depicts a simplified cross-sectional schematic of a scintillator material surrounded by an omnidirectional waveguide, the scintillator material undergoing a scintillation event, according to one embodiment.

Referring now to FIG. 3, a simplified cross-sectional schematic of a radiation detection system 300 comprising a scintillator material 302 surrounded by an omnidirectional waveguide 320 is shown, according to one embodiment. The omnidirectional waveguide 320 may have a structure substantially similar to that described above with reference to FIG. 2, in various approaches.

The scintillator material 302 may include any scintillator material, including organic polymers, crystals, and any other type of scintillator known to those having ordinary skill in the art. In various embodiments, for example, the scintillator material may include inorganic crystal-based materials such as cesium iodide, thallium-doped sodium iodide, europium-doped strontium iodide, thallium-doped cesium iodide, sodium-doped cesium iodide, barium fluoride, europium-doped calcium fluoride, gold-doped zinc sulfide, cerium-doped lanthanum chloride, cerium-doped lanthanum bromide, cerium-doped YAG ($Y_3Al_5O_{12}$); organic crystals such as anthracene, stillbene, naphthalene, polyethylene naphthalate; bases such as polyvinyltoluene (PVT), polystyrene (PS), polymethylmethacrylate (PMMA), polyvinyl xylene (PVX); fluors such as polyphenyl hydrocarbons, oxazoles, oxadiazole aryls, n-terphenyl (PPP), 2,5-diphenyloxazole (PPO), 1,4-di-(5-phenyl-2-oxazolyl)-benzene (POPOP), 2-phenyl-5-(4-biphenylyl)-1,3,4-oxadiazole (PBD), and 2-(4'-tert-butylphenyl)-5-(4"-biphenylyl)-1,3,4-oxadiazole (B-PBD), etc. as would be understood by one having ordinary skill in the art upon reading the present descriptions.

As shown in FIG. 3, the scintillator material 302 is undergoing a scintillation event 308 pursuant to absorbing incident radiation 306. The scintillation event 308 causes light to be emitted from the scintillator material 302. Preferably, the light is emitted toward a detector 304 coupled to the scintillator material 302 either directly or at an angle suitable for the photon to undergo TIR within the scintillator material 302 en route to the detector 304, such as is the case for photon traveling along photon trajectory 310. However, as described above regarding FIGS. 1A and 1B, light may be emitted at an angle falling within an escape cone 314, and thus escape the scintillator material 302 upon reaching the boundary of the scintillator material 302, such as is the case for photons traveling along photon trajectories 316 and 318, respectively.

Escaping photon traveling along photon trajectory 316 is similar to escaping photon traveling along photon trajectory 116 shown in FIGS. 1A and 1B. A photon traveling along trajectory 316 is emitted from the scintillator material 302 at an angle sufficiently close to normal to an outer surface (e.g. an edge, side, etc.) of the scintillator material 302 that the photon traverses the boundary between the scintillator material 302 and the omnidirectional waveguide 320, and is refracted into the omnidirectional waveguide 320. Light emitted by the scintillator material 302 is emitted in a predetermined spectral range, which may be a function of the material from which the scintillator material is composed, as would be understood by one having ordinary skill in the art upon reading the present descriptions. Accordingly, the omnidirectional waveguide 320 is preferably configured to reflect light having a wavelength within the spectral range of light emitted by the scintillator material 302.

Since the omnidirectional waveguide 320 of the illustrative embodiment shown in FIG. 3 is configured to reflect light having a wavelength within the spectral range of light emitted by the scintillator material 302, a photon traveling along photon trajectory 316 may pass through one or more layers of the omnidirectional waveguide 320. However, the photon traveling along photon trajectory 316 is ultimately reflected at one of the interfaces between the alternating layers at least in part as a result of the highly divergent refractive indices of the layers defining the interface.

Similarly, the omnidirectional waveguide 320 prevents substantially all losses of light due to backscatter. More particularly, if light is backscattered from a scintillation event at an angle within an escape cone 314, the light may be lost (i.e. not reach the detector 304) without being reflected back into the scintillator material 302. This is the case for escaping backscatter trajectory 318, as shown in FIG. 3. Since the omnidirectional waveguide 320 surrounds all sides, exterior surfaces, etc. of the scintillator material 302 except a side/surface of the scintillator material coupled to the detector 304, even backscattered light such as backscatter trajectory 318 is reflected back into the scintillator material 302 and ultimately to the detector 304.

In this manner, the vast majority of light losses may be avoided and light emitted by the scintillator material 302 can be transmitted to the detector 304 with very high efficiency, increasing signal strength and sensitivity of the radiation detector system 300. In preferred embodiments, the detector 304 receives at least 80% of the light emitted by the scintillator material 302, in more preferred embodiments at least 90% of the light emitted by the scintillator material 302, and in particularly preferred embodiments at least 99% of the light emitted by the scintillator material 302.

Similarly, in various embodiments the omnidirectional waveguide is configured to reflect at least 80% of light entering the omnidirectional waveguide 320 from the scintillator material 302, preferably at least 90% of light entering the omnidirectional waveguide 320 from the scintillator material 302, more preferably at least 95% of light entering the omnidirectional waveguide 320 from the scintillator material 302, and particularly preferably at least 99% of light entering the omnidirectional waveguide 320 from the scintillator material 302.

The omnidirectional waveguide reflects light back into the scintillator material 302 especially well when the radiation detection system 300 is configured such that the layer of the omnidirectional waveguide closest to the scintillator material has a refractive index highly divergent from a refractive index of the scintillator material. Thus, if the scintillator material is characterized by a low refractive index (e.g. RI≤1.2), then a refractive index of the layer of the omnidirectional waveguide closest to the scintillator material is preferably a high refractive index (e.g. RI≥1.4). Conversely, if the scintillator material is characterized by a high refractive index (e.g. RI≥1.4), then a refractive index of the layer of the omnidirectional waveguide closest to the scintillator material is preferably a low refractive index (e.g. RI≤1.2).

Figure 4A:
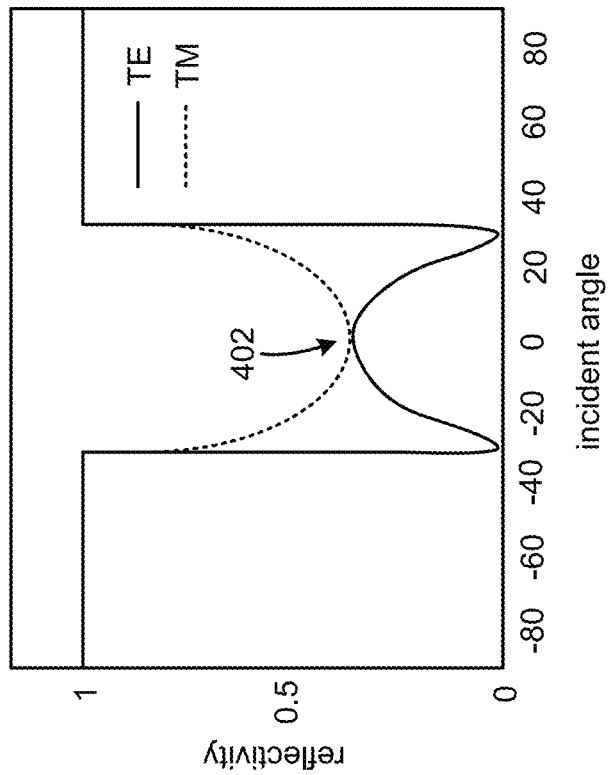
FIG. 4A depicts a graphical representation of scintillator material reflectivity to light as a function of incident angle of the photon trajectory, according to the prior art.

FIG. 4A depicts a graphical representation of scintillator material reflectivity as a function of incident angle of the photon trajectory, according to the prior art. Most notably, typical scintillator materials are not reflective over the entire angular domain, and an escape region 402 exists in an angular domain near normal incident angle (0 degrees). As shown in FIG. 4A, the escape region 402 encompasses incident angles in a range from approximately −15 degrees to approximately 15 degrees, corresponding to an approximately 30 degree escape cone such as shown in FIGS. 1A-1B. For reasons explained above, the existence of the escape region 402 is undesirable.

By contrast, FIG. 4B depicts a graphical representation of reflectivity of an radiation detection system including an omnidirectional waveguide to reflect light emitted from a scintillator material, according to one embodiment (such as shown in FIG. 3). The reflectivity is shown as a function of incident angle of the photon trajectory. Again, the reflectivity profile shown in FIG. 4B is devoid of any escape windows 402 such as shown in FIG. 4A, reinforcing the notion that the waveguide is truly omnidirectional, i.e. reflects light over the entire angular domain (−90 degrees to 90 degrees, where 0 degrees is normal to the surface forming a boundary between the omnidirectional waveguide and air).

Moreover, the radiation detection system achieves total internal reflection over nearly the entire angular domain for both a transverse magnetic (TM) polarization and a transverse electric (TE) polarization. Specifically, the radiation detection system may be characterized by a TM polarization reflectivity of approximately 1.0 at a waveguide-air interface for light generated by a scintillating event and having an incident angle $\theta_{TM}$ selected from: a first range of approximately $-90° \leq \theta_{TM} \leq -30°$, a second range of approximately $-20° \leq \theta_{TM} \leq 20°$, and a third range of approximately $30° \leq \theta_{TM} \leq 90°$. Similarly, the radiation detection system may be characterized by a TE polarization reflectivity of approximately 1.0 at a waveguide-air interface for light generated by a scintillating event and having an incident angle $\theta_{TE}$ selected from: a first range of approximately $-90° \leq \theta_{TE} \leq -30°$, a second range of approximately $-15° \leq \theta_{TE} \leq 15°$, and a third range of approximately $30° \leq \theta_{TE} \leq 90°$.

Figures 5A, 5B:
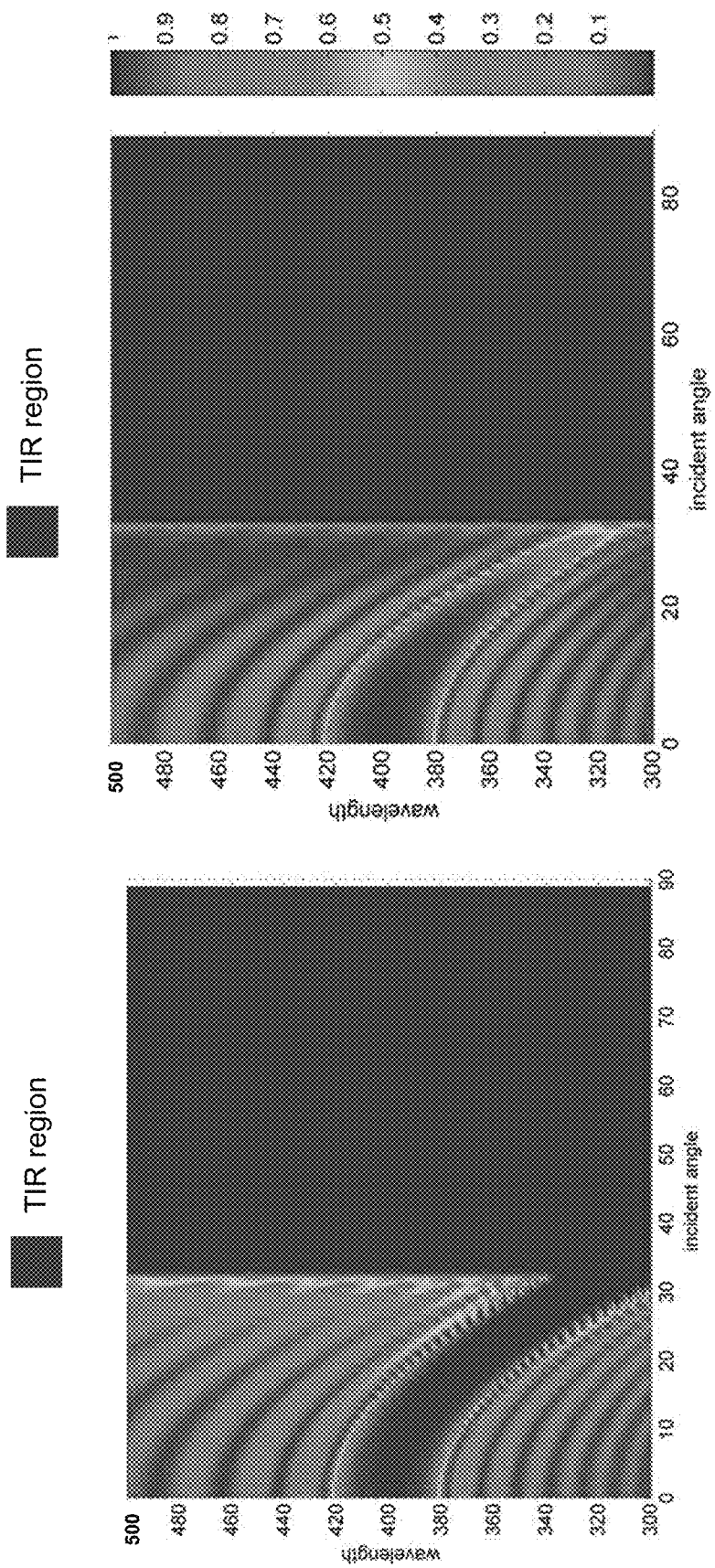
FIG. 5A is a heat map depicting light reflectance in a transverse electric polarization for a scintillator material surrounded by an omnidirectional waveguide as a function of incident angle and light wavelength, according to one embodiment.
FIG. 5B is a heat map depicting light reflectance in a transverse magnetic polarization for a scintillator material surrounded by an omnidirectional waveguide as a function of incident angle and light wavelength, according to one embodiment.

This relationship can also be viewed from the heat maps shown in FIGS. 5A and 5B, which generally show the reflectivity of one embodiment of the inventive radiation detection system described herein according to light wavelength and incident angle. FIG. 5A illustrates the relationship for the transverse electric polarization, and FIG. 5B similarly illustrates the relationship for the transverse magnetic polarization.

The system, according to the embodiment represented by FIGS. 5A and 5B, exhibits total internal reflection over nearly the entire angular domain for light in a spectral range from about 300 nm to about 500 nm in both polarizations (as shown by the solid dark grey region in the right half of each heat map, as well as in the photonic band gap, indicated by the curved dark grey region on the left half of each heat map). While the system does not necessarily exhibit TIR over the entire angular domain for the entire spectral range, the system is nonetheless very highly reflective to light within the spectral range and over the entire angular domain.

Figure 6:
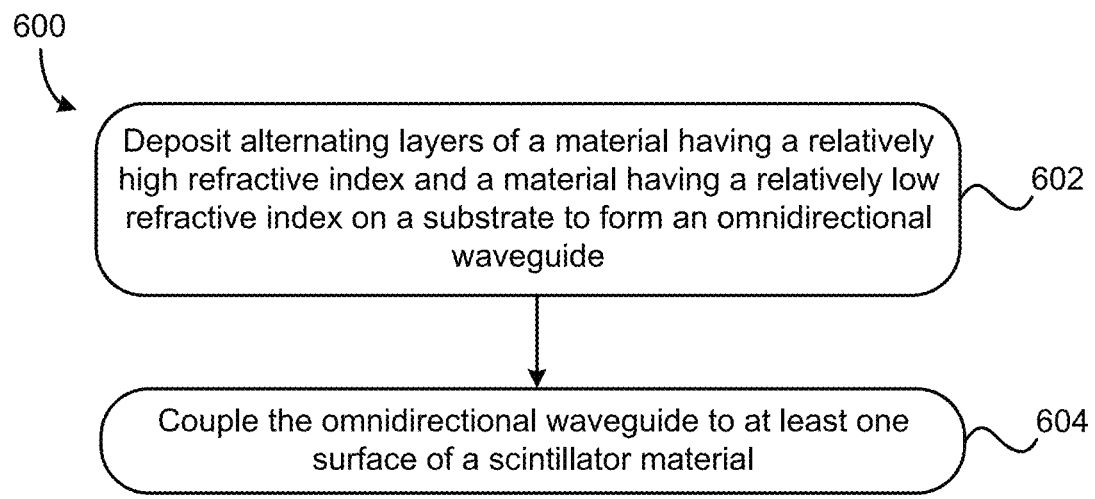
FIG. 6 is a flowchart of a method, according to one embodiment.

FIG. 6 is a flowchart of a method 600 for fabricating a radiation detection system commensurate in scope with the presently described inventive concepts, according to one embodiment. The method 600 may be performed in any suitable environment, including those shown in FIGS. 2-3, 4B-5 and 7, among others, in various approaches.

Method 600 includes operation 602, where alternating layers of a material having a relatively high refractive index and a material having a relatively low refractive index are deposited on a substrate to form an omnidirectional waveguide.

Method 600 also includes operation 604, where the omnidirectional waveguide is coupled to at least one surface of a scintillator material.

In various approaches, the method may include additional and/or alternative limitations and/or operations. For example, in some embodiments the coupling comprises bonding the omnidirectional waveguide to every surface of the scintillator material except a surface of the scintillator material coupled to a photomultiplier.

In more embodiments, the depositing comprises one or more of electron-beam evaporation, sputtering, atomic layer deposition, chemical vapor deposition, ion-beam deposition, etc. as would be understood by one having ordinary skill in the art upon reading the present descriptions.

General Scintillator System

Figure 7:
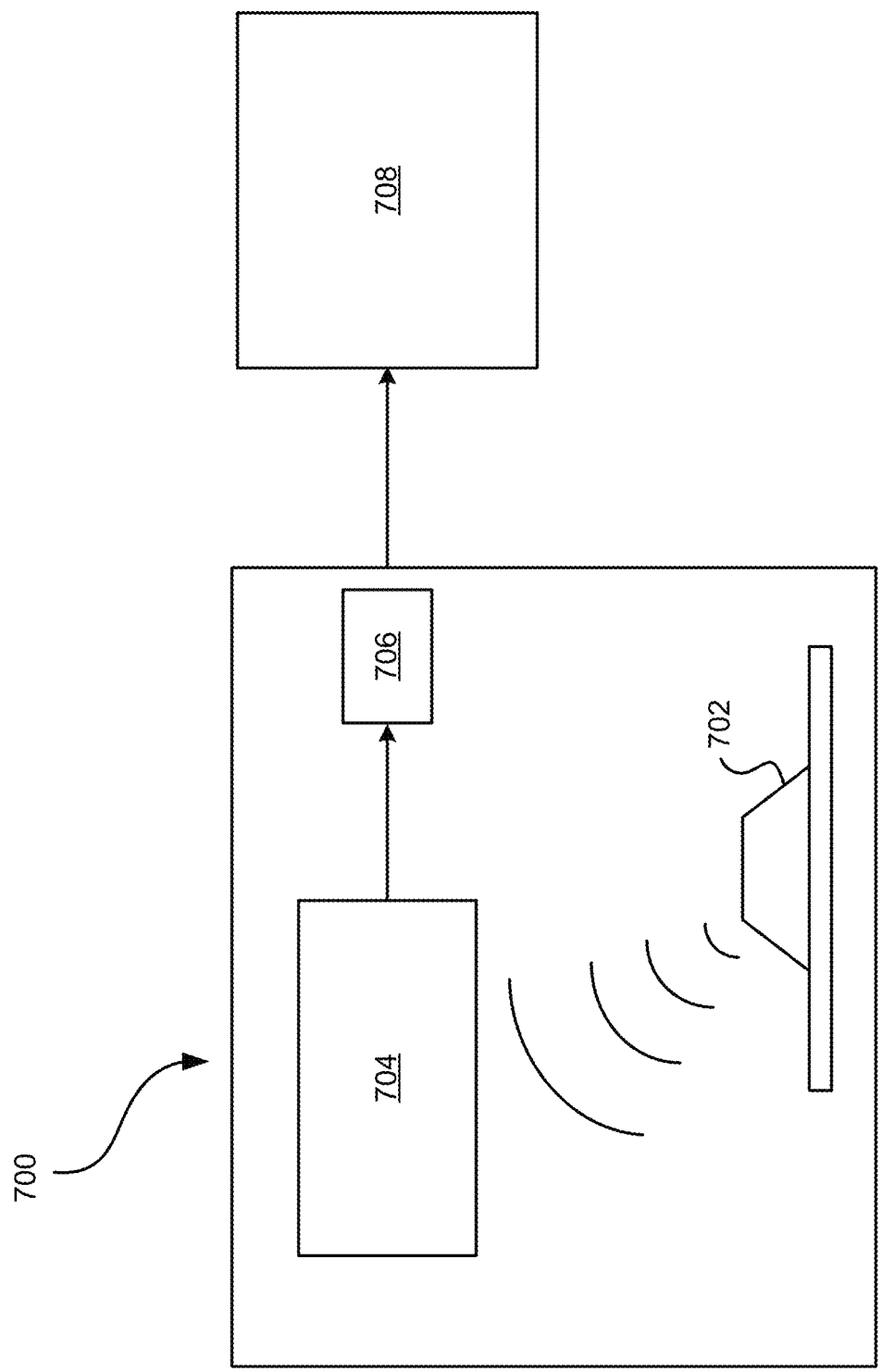
FIG. 7 is a simplified schematic of a radiation detection system comprising a scintillator material, according to one embodiment.

FIG. 7 depicts a simplified spectroscopy system according to one embodiment. The system 700 comprises a scintillator 702, such as of a type described herein, and which is typically crystalline. Scintillators may also be referred to as scintillator optics, scintillator crystals, etc. The system 700 also includes a photodetector 704, such as a photomultiplier tube, which can detect light emitted from the scintillator 702, and detect the response of the material to at least one of neutron and gamma ray irradiation.

The scintillator 702 produces light pulses upon occurrence of an event, such as a gamma ray or other radiation engaging the scintillator 702. As the gamma ray, for example, traverses the scintillator 702, photons are released, appearing as light pulses emitted from the scintillator 702. The light pulses are detected by the photodetector 704 and transduced into electrical signals that correspond to the pulses. The type of radiation can then be determined by analyzing the integral of the light pulses and thereby identifying the gamma ray energy absorbed by the scintillator.

In some embodiments, the system 700 may be, further comprise, or be coupleable/coupled to, a processing device 706 for processing pulse traces output by the photodetector 704. In other embodiments, the system 700 may include a processing device that receives data from a photodetector that is not permanently coupled to the processing device. Illustrative processing devices include microprocessors, field programmable gate arrays (FPGAs), application specific integrated circuits (ASICs), computers, etc.

The result of the processing may be output and/or stored. For example, the result may be displayed on a display device 708 in any form, such as in a histogram or derivative thereof.

Practical Applications

Embodiments of the present invention may be used in a wide variety of applications, and potentially any application in which high light yield and/or high resolution is useful.

Illustrative uses of various embodiments of the present invention include, but are not limited to, applications requiring radiation detection. Search, surveillance and monitoring of radioactive materials are a few such examples. Various embodiments can also be used in the nuclear fuel cycle, homeland security applications, nuclear non-proliferation, medical imaging, high energy physics facilities, etc.

Yet other uses include detectors for use in treaty inspections that can monitor the location of radiation sources in a nonintrusive manner. Further uses include implementation in detectors on buoys, at maritime ports, cargo interrogation systems, and instruments that emergency response personnel can use to detect or search for a clandestine radiation source. Assessment of radiological dispersal devices is another application.

Further embodiments may include medical radiation detectors, e.g., to identify radioactive isotopes in patients (e.g. PET scanners) and for x-ray radiography.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a scintillator material;
   a detector coupled to the scintillator material; and
   a waveguide coupled to the scintillator material, the waveguide comprising:
   a plurality of first layers comprising one or more materials having a refractive index in a first range;
   a plurality of second layers comprising one or more materials having a refractive index in a second range, the second range being lower than the first range, and
   a plurality of interfaces being defined between alternating ones of the first and second layers,
   wherein the one or more materials of the plurality of first layers comprise a different material than the scintillator material; and
   wherein the one or more materials of the plurality of second layers comprise a different material than the scintillator material.

2. The system as recited in claim 1, wherein the detector comprises one or more of a photomultiplier and a photodiode.

3. The system as recited in claim 1, wherein the waveguide surrounds all sides of the scintillator material except a side of the scintillator material coupled to the detector.

4. The system as recited in claim 1, wherein each of the interfaces are characterized as reflecting light having a wavelength in a predetermined spectral range.

5. The system as recited in claim 1, wherein a layer of the waveguide closest to the scintillator material is characterized by a refractive index characterized by a value difference of at least 0.1 relative to a refractive index of the scintillator material.

6. The system as recited in claim 1, wherein the waveguide reflects at least 95% of all light emitted from the scintillator material into the waveguide back into the scintillator material.

7. The system as recited in claim 1, wherein the detector receives at least 95% of light emitted from the scintillator material into the waveguide.

8. The system as recited in claim 1, wherein the scintillator material is characterized by a lower refractive index than a refractive index of a layer of the waveguide closest to the scintillator material.

9. The system as recited in claim 1, wherein the scintillator material is characterized by a higher refractive index than a refractive index of a layer of the waveguide closest to the scintillator material.

10. The system as recited in claim 1, wherein each interface separates layers having highly divergent refractive indices from each other.

11. The system as recited in claim 1, wherein the waveguide is characterized as reflecting light in a predetermined spectral range of from about 375 nm to about 475 nm.

12. The system as recited in claim 1, wherein the waveguide is configured to reflect light over an entire angular domain from −90 degrees to 90 degrees, and wherein 0 degrees of the angular domain corresponds to a direction normal to a surface forming a boundary between the waveguide and air.

13. The system as recited in claim 1, wherein each layer has a thickness t of no less than about $\lambda/4$, wherein $\lambda$ is a wavelength of light desired to be reflected in a material from which the layer is composed.

14. The system as recited in claim 1, wherein the waveguide is transparent to incident radiation of a predetermined type.

15. The system as recited in claim 1, wherein the waveguide comprises at least 10 layers.

16. The system as recited in claim 1, wherein the scintillator material comprises one or more of a polymer and a crystal.

17. The system as recited in claim 1, wherein the materials having the refractive index in the first range and the materials having the refractive index in the second range are each selected from a group consisting of: silicon oxide, aluminum oxide, titanium oxide, hafnium oxide, magnesium fluoride and calcium fluoride.

18. The system as recited in claim 1, wherein the waveguide is a dielectric mirror.

19. A method of forming the system as recited in claim 1, the method comprising:
depositing alternating layers of the one or more materials having the refractive index in the first range and the one or more materials having the refractive index in the second range on a substrate to form the waveguide; and
coupling the waveguide to at least one surface of the scintillator material.

20. The method as recited in claim 19, wherein the coupling comprises bonding the waveguide to every surface of the scintillator material except a surface of the scintillator material coupled to the detector.

21. The method as recited in claim 19, wherein the depositing comprises one or more of electron-beam evaporation, sputtering, atomic layer deposition, chemical vapor deposition and ion-beam deposition.

22. The system as recited in claim 1, A system, comprising:
a scintillator material;
a detector coupled to the scintillator material; and
an omnidirectional waveguide coupled to the scintillator material, the omnidirectional waveguide comprising:
a plurality of first layers comprising one or more materials having a refractive index in a first range; and
a plurality of second layers comprising one or more materials having a refractive index in a second range, the second range being lower than the first range, a plurality of interfaces being defined between alternating ones of the first and second layers;
wherein the omnidirectional waveguide is characterized by a transverse magnetic (TM) polarization reflectivity of approximately 1.0 at a waveguide-air interface for light generated by a scintillating event and having an incident angle $\theta_{TM}$ selected from:
a first range of approximately $-90° \leq \theta_{TM} \leq -30°$,
a second range of approximately $-20° \leq \theta_{TM} \leq 20°$, and
a third range of approximately $30° \leq \theta_{TM} \leq 90°$.

23. A system, comprising:
a scintillator material;
a detector coupled to the scintillator material; and
a waveguide coupled to the scintillator material, the waveguide comprising:
a plurality of first layers comprising one or more materials having a refractive index in a first range; and
a plurality of second layers comprising one or more materials having a refractive index in a second range, the second range being lower than the first range, a plurality of interfaces being defined between alternating ones of the first and second layers;
wherein the waveguide is characterized by a transverse magnetic (TE) polarization reflectivity of approximately 1.0 at a waveguide-air interface for light generated by a scintillating event and having an incident angle $\theta_{TM}$ selected from:
a first range of approximately $-90° \leq \theta_{TE} \leq -30°$,
a second range of approximately $-15° \leq \theta_{TE} \leq 15°$, and
a third range of approximately $30° \leq \theta_{TE} \leq 90°$.

* * * * *